March 19, 1963     B. LEFRANÇOIS ETAL     3,082,158
METHOD FOR PREPARING AMIDES OF POTASSIUM, RUBIDIUM OR CESIUM
Filed July 19, 1960
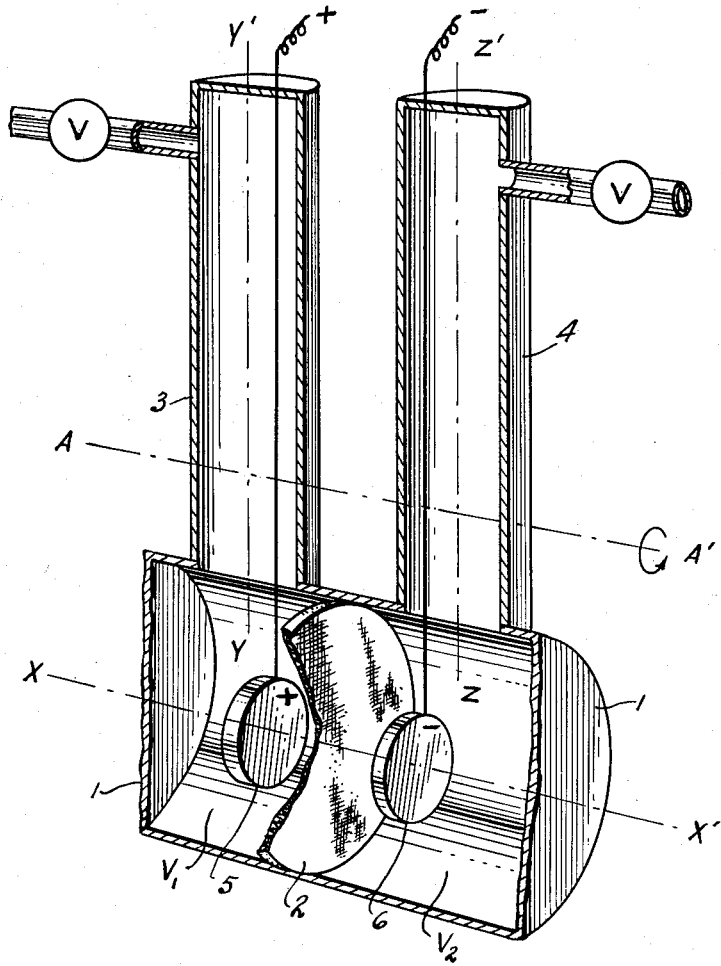
INVENTORS
BERNARD LEFRANÇOIS &
GERARD LEPOUTRE
BY
ATTORNEY.

United States Patent Office 3,082,158
Patented Mar. 19, 1963

3,082,158
METHOD FOR PREPARING AMIDES OF POTASSIUM, RUBIDIUM OR CESIUM
Bernard Lefrançois, Noeux-les-Mines, and Gérard Lepoutre, Lille, France, assignors to Houillères du Bassin du Nord et du Pas-de-Calais and Commissariat a l'Energie Atomique, Paris, France
Filed July 19, 1960, Ser. No. 43,896
Claims priority, application France July 22, 1959
2 Claims. (Cl. 204—59)

Among alkali amides, those of potassium, ubidium, and cesium are soluble in substantial proportions in liquid ammonia. Use is made of such ammoniacal solutions of alkali amides to carry out a number of chemical reactions of industrial interest, such as, for example, certain polymerisations of anionic type, and isotopic hydrogen/deuterium exchange reactions.

The storage of such amides in the dry state presents a serious danger because of the ease with which they combine with numerous reagents, including oxygen, which partly oxidises them into nitrites. The mixture of oxide, peroxide, nitrite, and amide constitutes an explosive mixture.

It is possible to prepare an ammoniacal solution of amides of this type by dissolving the corresponding alkali metal in liquid ammonia, and after a shorter or longer time this solution is converted into the corresponding amide with the generation of hydrogen.

A process of this type is difficult, dangerous, and expensive. It is in fact necessary to transport and handle alkali metals which are extremely unstable in the presence of traces of $CO_2$, oxygen, or humidity. The caustic character of these products is further the cause of numerous industrial accidents.

It is known moreover that the production of pure alkali metals (potassium, cesium, rubidium) by electrolysis of fused salts is difficult to carry out, so that these metals are relatively expensive. This process for obtaining the pure alkali metals is also dangerous.

It is therefore of great interest economically and technically, to provide for the preparation and utilisation of such solutions, while avoiding the expensive and dangerous handling of the amides in the dry state or of the corresponding alkali metals.

It has been proposed to produce ammoniacal solutions of alkali amides directly by electrolysis of alkali metal salts in the actual ammonia in which they are subsequently to be used. To this end use is made of salts which are themselves soluble to a considerable extent in liquid ammonia.

It is known in fact that the bromides, cyanides, carbonates, and, to a certain extent, chlorides of potassium, rubidium, and cesium are soluble in liquid ammonia, to which they impart sufficient conductivity to effect electrolysis.

It has also been proposed to use nitrates or nitrites of these metals for this purpose, but, as has been stated above, the mixture of nitrite and amide of alkali metals gives an explosive and hence very dangerous mixture.

This mode of preparation of amides by electrolysis, which avoids an intermediate stage of drying or isolation of the amides and therefore should have been highly desirable, has, in fact, never utilised on an industrial scale because of the almost insurmountable difficulties due to the presence of solutions of alkali metals in liquid ammonia. These particular solutions constitute a form of solution unknown in the aqueous phase, and in which the metal cation has the electron itself as anion. The mobility of such electrons is extremely high, so that they tend to diffuse rapidly between the electrodes and to produce short-circuits which are the source of abnormal consumption of current without equivalent production of substance.

Two methods have been proposed for avoiding these short-circuits due to the diffusion of electrons. In accordance with the first of these proposed methods, the electrolyte is made to flow through the cell very rapidly with a view to eliminating the metallo-ammoniacal solutions from the cathode department of the electrolysis cell. It is obvious that in this case a very large part of the initial electrolytes is not converted into amides and will pollute the final ammoniacal solution. Solutions thus polluted are not suitable for use in numerous reactions catalyzed by solutions of alkali amides in liquid ammonia.

The second known method of avoiding these short-circuits due to the diffusion of electrons is to carry out extremely slow electrolyses or electrolyses which are frequently interrupted in order to permit the metallo-alkali solutions to be converted into amides before the continuation of the electrolysis. It is obvious that such method results in an extremely low rate of output.

The object of the present invention is to provide a method making it possible to carry out electrolyses of alkali metals soluble in ammonia with a view to their conversion into soluble amide solutions, while simultaneously using continuously high current densities, higher than 0.10 amp. per sq. cm., and preventing the pollution of the soluble amide solutions by abnormally high concentrations of the initial electrolytes.

It has been discovered that the above object can be conveniently realized by carrying out the electrolysis at temperatures higher than the boiling point of ammonia.

In this case the conversion of the metallo-alkali solutions into amides is effected at a speed higher than the speed of diffusion of the electrons, so that the short-circuits are avoided and it is possible to obtain a relatively substantial rate of conversion of the initial electrolyte by carrying out the electrolysis in a "non-continuous" or batch process or by leaving the solution a long time in the electrolyser in the case of a continuous process.

The temperatures at which these electrolyses are carried out are preferably of the order of 10 to 30° C. The lower temperature limit is determined by the slowing of the speed of conversion into amides, which is not compensated for by the speed of diffusion of the electrons. The upper temperature limit is determined by the solubility of the alkali metal salts in liquid ammonia, which often has a negative temperature coefficient.

The minimum pressure is that of liquid $NH_3$ at $+20°$ C.

It is generally advantageous to use solutions of salts of alkali metal of a concentration of at least 100 g. per litre.

The equipment required for performing the process embodying this invention consists of an electrolysis apparatus, which may be of the kind illustrated in the accompanying drawing, wherein the single view is a perspective view in section on a vertical axial plane of an electrolysis cell. Referring to the drawing in detail, it will be seen that the electrolysis cell 1, constituted by an insulated metal cylinder having a horizontal axis X—X', with its interior being divided, by a diaphragm 2 of asbestos cloth, into two compartments $V_1$ and $V_2$. These compartments are in communication with cylinders 3 and 4, respectively, having their axes Y—Y' and Z—Z' perpendicular to the axis X—X' and further having volumes slightly greater than those of compartments $V_1$ and $V_2$. The anode 5 in compartment $V_1$ is constituted by a carbon disc and the cathode 6 in compartment $V_2$ is constituted by an iron disc.

The assembly of cylinders 1, 3 and 4 is adapted to turn about a horizontal axis A—A' situated in the plane of axes Y—Y' and Z—Z', which makes it possible, by inverting the assembly from the position shown in the drawing, to isolate rapidly in the cylinders 3 and 4 the solutions contained in the compartments $V_1$ and $V_2$.

The following specific examples were carried out in an apparatus of the type described above.

The first two examples are given by way of comparison in order to illustrate the results obtained at low temperature either with a continuous current or with an intermittent current of the same density.

Example 3 illustrates the method according to the invention, while Example 4 also illustrates the method according to the invention, but carried out with a solution having a low concentration.

Comparison of all these examples demonstrates that a remarkably high output is obtained according to the invention, without pollution of the desired ammoniacal solutions by the initial electrolytes.

*Example 1*

The electrolysis is carried out at −58° C. The pressure is of the order of 0.25 atmosphere, and is equal to the vapour tension of ammonia at −58° C. at the commencement of the electrolysis; it increases slightly as the result of the generation of gas during the electrolysis.

The electrolyte is a solution of potassium bromide in ammonia with a concentration of 100 g. per litre.

The current density is 0.15 amp. per sq. cm. The difference of potential applied to the electrodes is 33 volts. After two hours of continuous electrolysis the total output in current is 10%, the final content of potassium bromide in the cathode compartment is 88 g. per litre. The total output is not improved by an increase in pressure obtained through the presence of an atmosphere of an inert gas, for example nitrogen.

*Example 2*

The electrolysis is carried out at −58° C. The pressure is of the order of 0.25 atmosphere and is equal to the vapour tension of ammonia at −58° C. at the commencement of the electrolysis; it increases slightly through the generation of gases during the electrolysis.

The electrolyte is a solution of potassium bromide in ammonia with a concentration of 100 g. per litre.

The mean current density is 0.15 amp. per sq. cm. The difference of potential applied to the electrodes is 33 volts.

After 2 hours of electrolysis, carried out in periods of 15 minutes separated by intervals of 10 minutes, during which the apparatus previously described is inverted around the axis A—A, the total output in current is of the order of 20%, and the final content of potassium bromide in the cathode compartment is 77 g. per litre.

*Example 3*

The electrolysis is carried out at +15° C. The pressure is of the order of 7 kg. per sq. cm. and is equal to the vapour tension of ammonia at +15° C. at the commencement of the electrolysis; it increases slightly through the generation of gases during the electrolysis.

The electrolyte is a solution of potassium bromide in ammonia with a concentration of 100 g. per litre.

The current density is 0.15 amp. per sq. cm. The difference of potential applied to the electrodes is 27 volts.

After two hours of continuous electrolysis the total output in current is 70%, the final content of potassium bromide in the cathode compartment is 21 g. per litre.

*Example 4*

The electrolysis is carried out at +20° C. The pressure is of the order of 8 kg. per sq. cm. and is equal to the vapour tension of ammonia at 20° C. at the commencement of the electrolysis; it increases slightly through the generation of gases during the electrolysis.

The electrolyte is a solution of potassium bromide in ammonia with a concentration of 50 g. per litre.

The mean current density is 0.15 amp. per sq. cm. The difference of potential applied to the electrodes is 31 volts.

After two hours of continuous electrolysis the total output in current is 55%, the final content of potassium bromide in the cathode compartment is 12 g. per litre.

We claim:

1. A method for the preparation of amides of an alkali metal selected from the group consisting of potassium, rubidium and cesium; which consists in electrolysing a solution of the selected alkali metal in liquid ammonia with a concentration of at least 100 grams of said metal per litre of ammonia in a closed vessel at a temperature within the range of approximately 10° C. to 30° C. and at the autogenous pressure of the liquid ammonia, and with a current density for the electrolysis of at least 0.10 ampere per square centimeter.

2. A method as in claim 1; wherein the electrolysis is carried out with an iron cathode acting as a catalyst.

References Cited in the file of this patent
UNITED STATES PATENTS
2,245,831    Silsby _____ June 17, 1941